(12) United States Patent
Ping et al.

(10) Patent No.: US 9,501,427 B2
(45) Date of Patent: Nov. 22, 2016

(54) PRIMARY MEMORY MODULE WITH RECORD OF USAGE HISTORY

(71) Applicant: INTERNATIONAL BUSINESS MACHINES CORPORATION, Armonk, NY (US)

(72) Inventors: Chang Li Ping, New Taipei (TW); Alpus P. Chen, Taipei (TW); Chun-Wei Chen, New Taipei (TW); Elysee Hsieh, Taipei (TW); Kelvin Shieh, Taipei (TW); Wei-Chin Tsai, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 14/192,106

(22) Filed: Feb. 27, 2014

(65) Prior Publication Data
US 2014/0297975 A1 Oct. 2, 2014

(30) Foreign Application Priority Data
Mar. 29, 2013 (TW) .............................. 102111378 A

(51) Int. Cl.
*G06F 12/02* (2006.01)
*G06F 12/12* (2016.01)
*G06F 11/30* (2006.01)
*G06F 12/06* (2006.01)

(52) U.S. Cl.
CPC ......... *G06F 12/122* (2013.01); *G06F 11/3037* (2013.01); *G06F 12/0646* (2013.01); *G06F 2201/88* (2013.01); *G06F 2212/1041* (2013.01)

(58) Field of Classification Search
None
See application file for complete search history.

(56) References Cited

U.S. PATENT DOCUMENTS

| | | | |
|---|---|---|---|
| 8,074,011 B2 | 12/2011 | Flynn et al. | |
| 8,108,180 B2 | 1/2012 | Astigarraga et al. | |
| 2004/0088511 A1* | 5/2004 | Bacon et al. | 711/167 |
| 2005/0125703 A1* | 6/2005 | Lefurgy et al. | 713/320 |
| 2007/0058410 A1* | 3/2007 | Rajan | 365/63 |
| 2007/0198874 A1 | 8/2007 | Watanabe | |
| 2007/0233931 A1* | 10/2007 | Tanaka et al. | 711/5 |
| 2010/0162055 A1 | 6/2010 | Morita et al. | |
| 2011/0208998 A1* | 8/2011 | Hosaka | 714/14 |
| 2012/0042204 A1 | 2/2012 | Smith et al. | |
| 2012/0124273 A1 | 5/2012 | Goss et al. | |

FOREIGN PATENT DOCUMENTS

| | | |
|---|---|---|
| EP | 1835403 A2 | 9/2007 |
| JP | 55-25807 A | 2/1980 |
| JP | 2007207092 A | 8/2007 |
| JP | 2010152542 A | 7/2010 |
| JP | 2010-250707 A | 11/2010 |

OTHER PUBLICATIONS

International Application No. PCT/IB2014/059790, International Filing Date: Mar. 14, 2014, International Search Report and Written Opinion dated Jun. 24, 2014.

* cited by examiner

*Primary Examiner* — Charles Rones
*Assistant Examiner* — Ryan Dare
(74) *Attorney, Agent, or Firm* — Brian F. Russell; Steven L. Bennett

(57) ABSTRACT

Provided is a primary memory module including a counter for providing a count indicative of the numbers of times the primary memory module has ever been read/written by a processor. With the count, an operating situation of the primary memory module is evaluated so as to optimize memory allocation performed by the operation system, adjust the operating mode of the primary memory module, and send a warning message to a user, for example.

10 Claims, 3 Drawing Sheets

PRIMARY MEMORY MODULE WITH RECORD OF USAGE HISTORY

This application is based on and claims the benefit of priority from Taiwan Patent Application 102111378, filed on Mar. 29, 2013.

BACKGROUND OF THE INVENTION

The present invention relates to primary memory (also known as main memory) modules, and more particularly, to a primary memory module with a record of usage history.

A primary memory in a computer system is essentially provided for a processor (CPU) to store temporary programs and data currently being processed, and comes in two categories according to structure and functionality, namely, read-only memory (ROM) and random access memory (RAM). A secondary memory stores both processed and unprocessed programs and data, can get back the stored programs and data even when not powered, and usually features large capacity and permanent storage. Examples of the secondary memory include magnetic disk, magnetic tape, and compact disk.

The primary memory, such as DRAM, is typically manufactured by an integrated circuit process. Details of DRAM can be found, for example, in "Memory technology evolution: an overview of system memory technologies," *Technology brief* 9th edition, published by Hewlett-Packard, which is incorporated herein by reference.

Although, theoretically speaking, DRAM is subject to no limit on the number of times it can be read and written, this is not true in practice. Like any other industrial product, a primary memory does not have an unlimited service life even when it is used appropriately. In general, as usage time passes, a primary memory module undergoes wear and tear and thereby ends up with various failures, for example, single bit errors and multiple bit errors. Conventionally, single bit errors can be detected and corrected according to the prior art, but multiple bit errors can be detected but not corrected. If the core code of the a data processing system executes from a memory region including a multiple bit error, the multiple bit error can cause the data processing system to hang.

BRIEF SUMMARY

Conventionally, users cannot proactively determine the life status of a primary memory module (i.e., whether the primary memory module has a good status or is on the verge of failure). Even with the latest system chipset technology, the life status of the primary memory module cannot be determined in order to remind the user to timely change the primary memory module. The user seldom discovers that the primary memory module has become unusable until the primary memory module fails and causes the system to hang (or until the system chipset disables the operation of the primary memory module.) That is to say, the prior art does not provide any mechanism for recording the usage history or "age" of a primary memory. As a result, the system cannot provide a corresponding management and analysis mechanism.

In view of this shortcoming, the present invention, in an aspect thereof, provides a primary memory module with a recording mechanism for recording the usage history of the primary memory module, such that a processor or system administrator can determine the "age" of the primary memory module accordingly and thus can determine whether the primary memory is "young" or "old", so as to take a corresponding managerial action, including optimizing memory allocation performed by the operation system, adjusting the operating mode of the primary memory module, and sending a warning message to the user. The primary memory module is not necessarily problematic for being "young" or "old". However, in general, an "old" primary memory has a higher chance than a "young" primary memory in having a failure.

The present invention, in another aspect thereof, provides a primary memory module with a lifelong recording mechanism for not only recording the lifetime usage history of the primary memory module without operation interruption, but also accompanying the primary memory module its lifetime, even in the presence of power interruption to the primary memory module and/or replacement and/or re-installation of the primary memory module in different computer systems.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
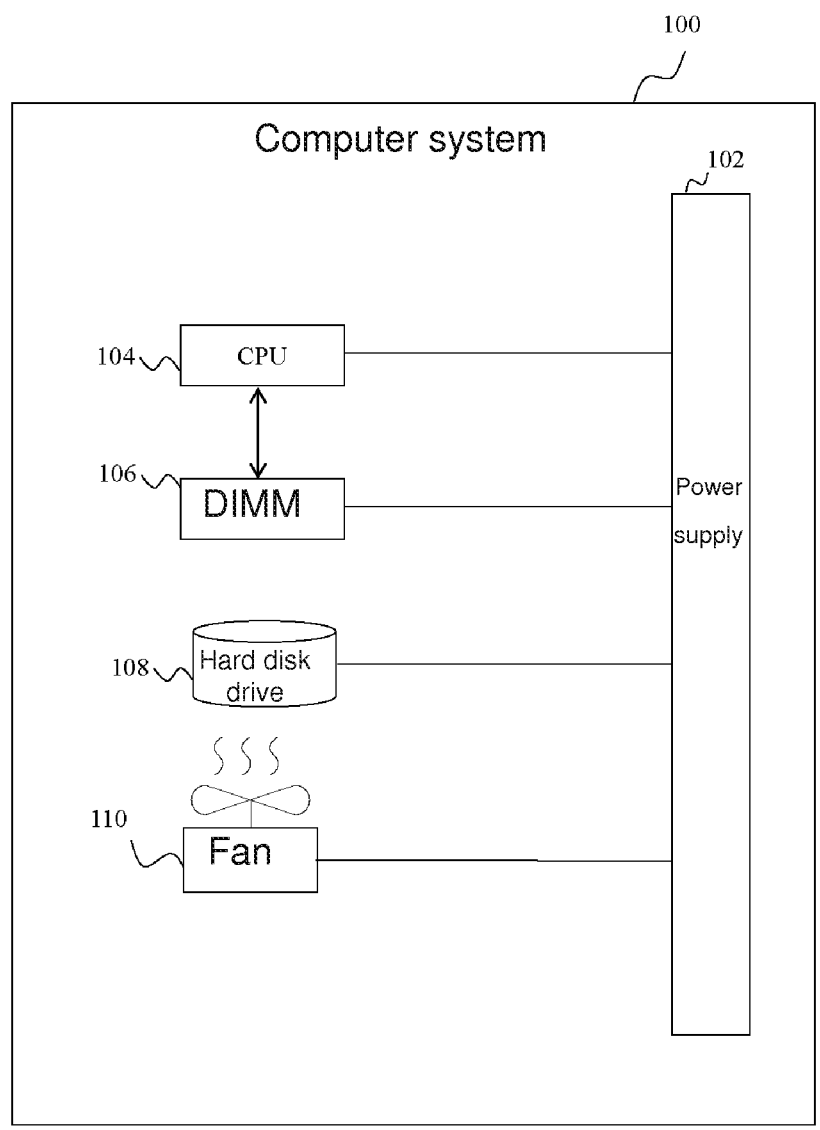
FIG. 1 is a block diagram of a computer system according to an embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system, a method or a computer program product. Accordingly, the present invention may take the form of an entirely hardware embodiment, a software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
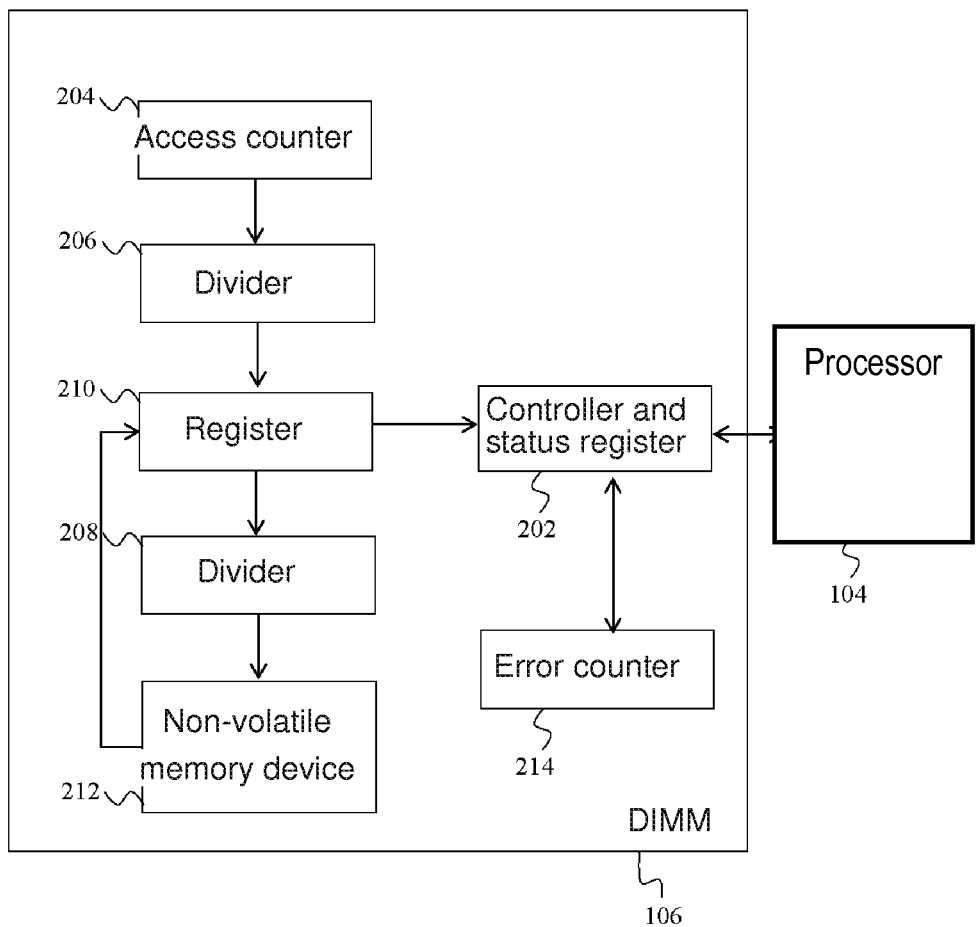
FIG. 2 is a block diagram of a primary memory module according to an embodiment of the present invention.
Figure 3:
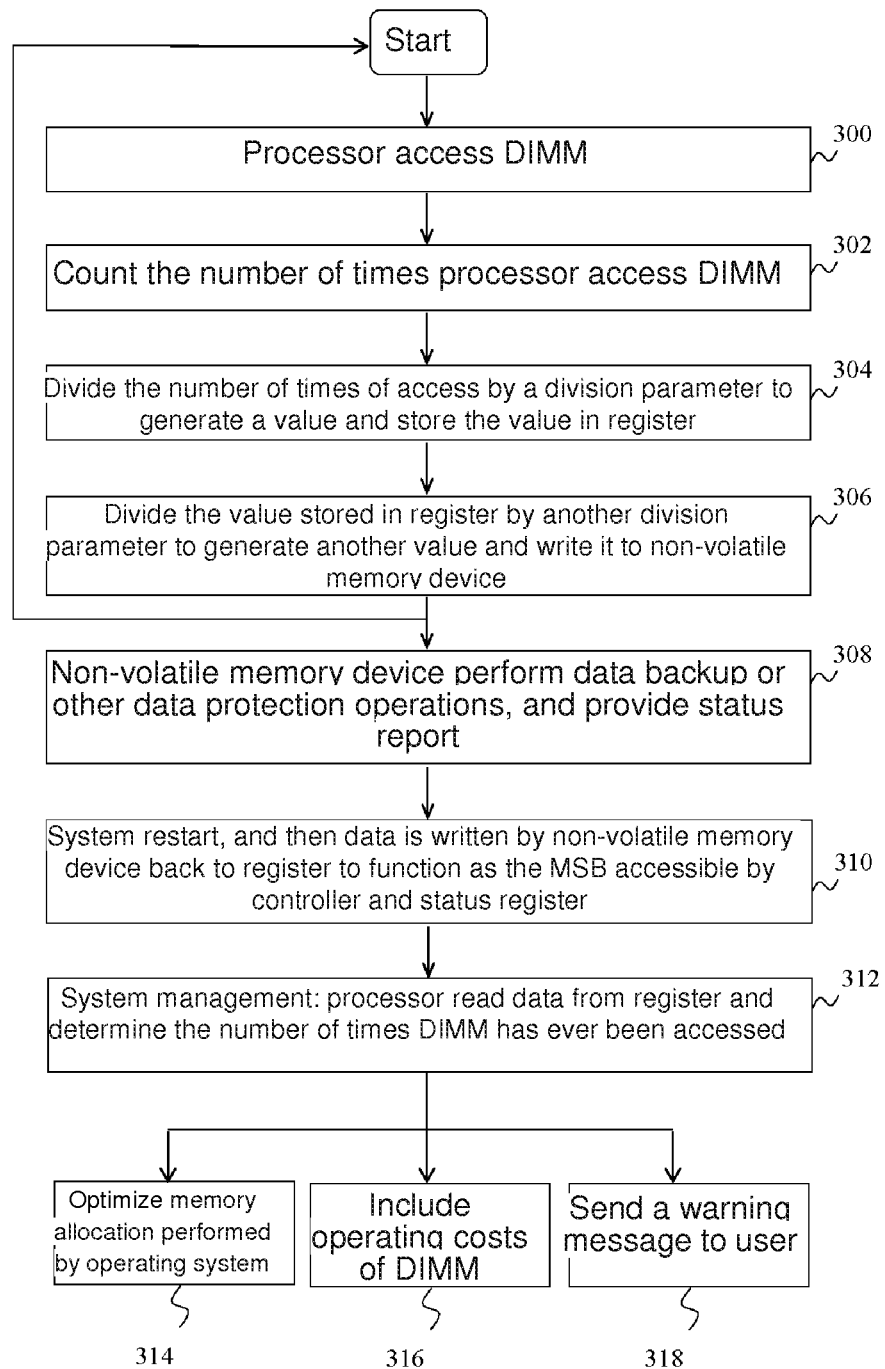
FIG. 3 is a flowchart of a method according to an embodiment of the present invention.

Referring now to FIG. 1 through FIG. 3, computer systems, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a hardware framework of a computer system 100 in an embodiment. The computer system 100 comprises a power supply 102, a central processing unit (CPU) 104, a primary memory module 106, a secondary memory module 108 (for example, a hard disk drive, compact disk, solid-state drive (SSD), or any other mass storage device), and a fan 110.

Other basic frameworks and components of the computer system 100 are identical to conventional ones of a typical personal computer or server, such as IBM's System X, Blade Center or eServer, and thus they are not described in detail for the sake of brevity.

In this embodiment, the primary memory module 106 comes in the form of a dual in-line memory module (DIMM), but persons skilled in the art understand that the present invention is not limited thereto. The DIMM 106 is mounted on a slot (not shown) on a motherboard and adapted to communicate with the CPU 104 by means of a chipset (not shown) and provide read/write instructions to the CPU 104. Further details of the basic framework of the DIMM 106 are disclosed in the description of a conventional DIMM in US Pub. 2012/0079314 filed by the applicant of this patent application and thus are not described herein for the sake of brevity. The differences between the DIMM 106 in the embodiments of the present invention and the conventional DIMM of the prior art are illustrated with FIG. 2 and further described below.

In the embodiment illustrated with FIG. 2, the DIMM 106 comprises a controller and status register 202, an access counter 204, dividers 206, 208, a register 210, a non-volatile memory device 212, and an error counter 214. After perusing the description below, persons skilled in the art will understand that a portion of the components shown in FIG. 2 can be omitted as needed, that is, not all of the components shown in FIG. 2 are required for the implementation of the present invention. Furthermore, like the conventional DIMM, the DIMM 106 in an embodiment of the present invention comprises an array of memory cells (not shown in FIG. 2) for storing data.

The controller and status register 202 is disposed in the primary memory module 106, known also as on-DIMM controller and status register (or control logic and status register), and adapted to control the basic operation of the DIMM 106. The controller and status register 202 has an internal function and an external function. As regards its internal function, the controller and status register 202 communicates with the other components (including DRAM memory cells) of the DIMM 106. As regards its external function, the controller and status register 202 communicates with a chipset (not shown) mounted on the motherboard to further communicate with the CPU 104. The controller and status register 202 may come in the form of a conventional registered SDRAM module or advanced memory buffer module, and its details are disclosed in "Memory technology evolution: an overview of system memory technologies," *Technology brief* 9th edition, published by Hewlett-Packard, and disclosed in "6400/6402 Advanced Memory Buffer Datasheet" published by Intel.

The other components of the DIMM 106 are illustrated with the process flow of a method described below.

The process flow of the method according to an embodiment of the present invention is illustrated with FIG. 3 and described below. At step 300, the CPU 104 accesses the DIMM 106, by writing data to or reading data from the memory cells of the DIMM 106. In general, the CPU 104 accesses the DIMM 106 at a frequency of 1333 MHz or higher.

At step 302, in response to detecting a request made by the CPU 104 to access the DIMM 106 in step 300, the access counter 204 increments a count of the number of times the CPU 104 accesses the DIMM 106. Depending on the application involved, the access counter 204 counts the number of times of reading only, the number of times of writing only, or the total number of times of reading and writing, but the present invention is not limited thereto. Like a conventional counter based on a hardware circuit framework, the access counter 204 of the present invention has an upper limit of count and counts anew by return-to-zero as soon as a count exceeds the upper limit of count.

At step 304, as described above, the CPU 104 accesses the DIMM 106 at a frequency of at least 1 MHz, and thus, understandably, the count generated by the access counter 204 is enormously large. Understandably, the processing and storage of an enormously large numeric value is seldom efficient. Hence, preferably, (and optionally), the divider 206 reads the count of the access counter 204 and divides the count by a division parameter (say, 1333 million (M)) to generates a value, such that the value is stored in the register 210 to wait for subsequent processing, for example, to be accessed by the controller and status register 202 and thereby sent to the CPU 104.

In this embodiment, as soon as the count of the access counter 204 increases to a division parameter (such as 1333 million) set for the divider 206, the divider 206 increases the value stored in the register 210 in step 304 by 1. Hence, even though the count of the access counter 204 reaches the upper limit and thus the access counter 204 counts anew by return-to-zero, the value in the register 210 increases cumulatively rather than returns to zero, thereby recording the usage history of the DIMM 106 accurately. Furthermore, the division parameter set by the divider 206 is configurable as needed.

In general, the register 210 comes in the form of a volatile storage device, and it writes and reads data faster than the non-volatile memory device 212 does. However, in case of power interruption, (for example, when the system shuts down), the data stored in the register 210 will be lost. To prevent this problem from happening, data of the register 210 is copied to the non-volatile memory device 212 and stored therein. Hence, even if the data of the register 210 is lost as a result of power interruption, the data stored in the non-volatile memory device 212 will not be lost. Once the power is restored, the process flow of the method will go through steps 300-304 again; hence, count-related data will be stored in the register 210 again and copied to the non-volatile memory device 212 and stored therein, and in consequence the cumulative increment in the value stored previously in the non-volatile memory device 212 will resume.

In general, the non-volatile memory device 212 (such as flash memory) is subject to a limitation on the number of times it can be written, and thus it is preferable to avoid writing data to the non-volatile memory device 212 frequently. In an embodiment, the divider 208 reads and accesses a value of the register 210 and divides the value by another division parameter (also configurable as needed) to generate another value and write the other value to the non-volatile memory device 212 (step 306). As soon as the value of the register 210 reaches a division parameter (such as a hundred or a thousand) set by the divider 208, the divider 208 increases the value stored in the non-volatile memory device 212 by 1. Hence, understandably, it is only when the number of times the CPU 104 accesses the DIMM 106 exceeds the product of the division parameter of the divider 206 and the division parameter of the divider 208 that the data in the non-volatile memory device 212 must be updated (i.e., increased by 1), thereby avoiding data from being written to the non-volatile memory device 212 too frequently.

In another embodiment, the divider 208 is not required, but the non-volatile memory device 212 is configured with a write-back time, that is, after a value of the register 210 has been written to the non-volatile memory device 212, the write-back time must pass in order for data to be written to the non-volatile memory device 212 again. During the write-back time, the primary memory module 106 can be accessed by the CPU 104 as usual, whereas the register 210 can be updated accordingly (steps 300-304). Hence, after the write-back time has lapsed and thus writing is allowable, the register 210 can write the latest value to the non-volatile memory device 212, thereby avoiding data from being written to the non-volatile memory device 212 too frequently.

At step 308, the non-volatile memory device 212 selectively performs data backup or other data protection operations on the data (value) written from the register 210 to thereby avoid data damage or loss and provide a status report on the current usage status of the non-volatile memory device 212. Related details are embodied in conventional non-volatile memory devices and thus are not described herein for the sake of brevity.

As described before, the register 210 typically comes in the form of a volatile storage device, and it writes and reads data faster than the non-volatile memory device 212 does. Hence, it is advantageous for the register 210 to provide count data to the controller and status register 202. To this end, in an embodiment, the non-volatile memory device 212 performs a self-test as soon as the system boots, so as to determine whether the non-volatile memory device 212 has a valid value (i.e., the value stored in step 306). If the determination is affirmative, the non-volatile memory device 212 will write its value back to the register 210, for example, and treat the value as the most significant bit (MSB) of the register 210 (step 310).

After the system has restarted, the primary memory module 106 is accessed by the CPU 104, whereas the register 210 is updated accordingly (steps 300-304). At this point in time, the value stored in the register 210 functions as the least significant bit (LSB) (see step 304). Then, the controller and status register 202 reads the most significant bit (MSB) and the least significant bit (LSB) together from the register 210 and provides them to the CPU 104. Persons skilled in the art understand that, in this embodiment, the most significant bit (MSB) in the register 210 represents the number of times the DIMM 106 has ever been accessed by the CPU 104 before the system starts in this present instance, whereas the least significant bit (LSB) in the register 210 represents the number of times the DIMM 106 has ever been accessed by the CPU 104 after the system starts in this present instance. Hence, with the most significant bit (MSB) and the least significant bit (LSB) being read together, the CPU 104 gains insight into the full and complete access history of the DIMM 106.

As described before, given the most significant bit (MSB) and the least significant bit (LSB) in the register 210, the CPU 104 is informed in a real-time manner of the number of times the DIMM 106 has ever been accessed (step 312), and further executes a corresponding management procedure pertaining to the DIMM 106. The management procedure executed by the CPU 104 is either provided by the operating system or application programs under the operating system, or provided by means of system firmware. Embodiments of the management procedure are described below in steps 314, 316, and 318, but persons skilled in the art understand that steps 314, 316, 318 merely serve an illustrative purpose, and the present invention is not limited thereto. Furthermore, whatever applications involved in a usage history record in the DIMM 106 fall into the scope of the present invention.

In the embodiment shown at step 314, the CPU 104 optimizes memory allocation performed by the operating system or application programs according to the number of times the DIMM 106 has ever been accessed. For example, the CPU 104 determines that the number of times the DIMM 106 has ever been accessed is overly high (that is, the DIMM 106 is an "old" primary memory), and thus executes a management procedure to reduce the memory allocated to the operating system or a specific application program, that is, restricting the memory usage of the operating system or a specific application program to thereby further reduce the number of times the CPU 104 accesses the DIMM 106 so as to reduce the rate the DIMM 106 is accessed by the CPU 104 (i.e., slowing down the aging of the DIMM 106). For more details of memory allocation, read "Memory Usage Performance Guidelines: Tips for Allocating Memory" published by Apple.

In the embodiment depicted at step 316, the number of times DIMM 106 has ever been accessed can be specifically recorded and thus treated as a measurable quantization parameter and used in assessing the "operating costs" of the DIMM 106. To optimize the operating costs of the system in its entirety, it is feasible to further adjust the operation mode of the DIMM 106 (for example, decreasing or increasing the access rate of the DIMM 106). The operating costs of memory modules are disclosed in Taiwan Patent Application 100148413, entitled MEMORY CONTROL METHOD AND COMPUTER SYSTEM FOR PERFORMING THE SAME and filed by the applicant of this patent application and thus are not described herein for the sake of brevity.

In another embodiment shown at step 318, the CPU 104 compares the number of times the DIMM 106 has ever been accessed and a threshold; if the number of times of access exceeds the threshold, the DIMM 106 will be regarded as an "old" primary memory module, and the CPU 104 will execute the application programs to send a warning message to the user (step 318) to remind the user to change the DIMM 106 in advance.

In addition to recording the number of times the DIMM 106 has ever been accessed by the CPU 104 and using it as a reference for the usage history of the DIMM 106 as illustrated with FIG. 3 and described in the preceding embodiment, another embodiment of the present invention entails using the error counter 214, rather than the access counter 204, to count the number of times an error has ever occurred to the DIMM 106 and using the controller and status register 202 of the DIMM 106 to report bit errors to the operating system or firmware. In this embodiment, errors of the DIMM 106 include single bit errors and multiple bit errors. The presence of a single bit error does not necessarily mean that the DIMM 106 has damaged so much that it cannot operate. In general, the DIMM 106 is capable of restoring data automatically to correct a single bit error. By contrast, the presence of a multiple bit error usually means that the DIMM 106 has damaged so much that it cannot operate and thus has to be replaced immediately.

Understandably, the cumulative number of errors which have occurred to the DIMM 106 is higher when the DIMM 106 is old than when the DIMM 106 is new. Hence, as in the case of the access rate of the CPU 104 described above, the cumulative number of errors which have occurred to the DIMM 106 is also an indicator of the usage history or "age" of the DIMM 106.

Like the access counter 204, the error counter 214 can operate in conjunction with the register 210 and the non-volatile memory device 212, especially to preclude any problems arising from counter return-to-zero and power interruption-induced data loss. Unlike the access counter 204, the error counter 214 can usually operate without the dividers 206, 208, because the number of errors which have ever occurred to the DIMM 106 is usually much less than the number of times the DIMM 106 has ever been accessed by the CPU 104.

Advantages of the embodiments of the present invention are as follows: first, the access counter 204 and the error counter 214 measure the operation of the DIMM 106 directly to yield a measurement result much more accurate than the one yielded by conventional ways of evaluating the operation of the DIMM 106 indirectly; second, unlike the prior art, the present invention enables a system to make reference to the result of measurement performed by the access counter 204 and the error counter 214 in order to perform administrative operations, including optimizing memory allocation performed by the operation system, adjusting the operating mode of the primary memory module, and sending a warning message to the user, so as to ensure the reliability of the system.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A primary memory module for a data processing system, the primary memory module comprising:
   a volatile memory array accessible by a processor of the data processing system;
   an access counter that maintains a first count value indicative of a number of selected accesses to the volatile memory array by the processor;
   a divider coupled to the access counter, wherein the divider produces a second count value by dividing the first count value;
   a volatile register that maintains the second count value;
   a non-volatile memory device that stores a third count value derived from the second count value; and
   a controller that, following an interruption of power to the primary memory module, determines a number of the selected accesses to the volatile memory array of the primary memory module from the second count value in the volatile register and the third count value in the non-volatile memory device and outputs the number of selected accesses from the primary memory module, wherein the controller determines the number of the selected accesses using the third count value retrieved from the non-volatile memory device as higher order bits of the number and using the second count value retrieved from the volatile register as lower order bits of the number.

2. The primary memory module of claim 1, wherein:
   the divider is a first divider; and
   the primary memory module further includes a second divider coupled to the register and configured to produce the third count value by dividing the second count value.

3. The primary memory module of claim 1, further comprising:
   an error counter that maintains an error count of bit errors detected in the volatile memory array.

4. The primary memory module of claim 1, wherein the volatile memory array comprises a dynamic random access memory (DRAM) array.

5. The primary memory module of claim 1, wherein the selected accesses comprise only one of a set including read accesses and write accesses.

6. The primary memory module of claim 1, and further comprising a timer, wherein the primary memory module limits a frequency of update to the non-volatile memory device by reference to the timer.

7. A data processing system, comprising:
   a primary memory module in accordance with claim 1; and
   a processor coupled to the primary memory module.

8. The data processing system of claim 7, wherein the processor executes a management procedure pertaining to the primary memory module according to the number of the selected accesses.

9. The data processing system of claim 8, wherein the management procedure optimizes memory allocation by the operating system.

10. The data processing system of claim 8, wherein the management procedure modifies a rate of access to the volatile memory array.

* * * * *